United States Patent [19]

Matsumoto

[11] 4,448,201

[45] May 15, 1984

[54] DIGITAL SCAN CONVERTER

[75] Inventor: Kenzo Matsumoto, Yokohama, Japan

[73] Assignee: Tokyo Shibaura Denki Kabushiki Kaisha, Kawasaki, Japan

[21] Appl. No.: 315,154

[22] Filed: Oct. 26, 1981

[30] Foreign Application Priority Data

Oct. 27, 1980 [JP] Japan .................. 55-150311

[51] Int. Cl.³ .................................. A61B 10/00
[52] U.S. Cl. ......................... 128/660; 358/112
[58] Field of Search .............. 73/620, 625, 626; 128/660; 358/112, 140

[56] References Cited

U.S. PATENT DOCUMENTS 4,310,907  1/1982  Tachita et al. ............... 128/600

FOREIGN PATENT DOCUMENTS 51-137344  11/1976  Japan .

OTHER PUBLICATIONS

Ophir, J. et al., "Digital Scan Converters in Diagnostic Ultrasound Imaging," Proceedings of the IEEE vol. 67, No. 4, Apr. 1979, pp. 654–664.

Primary Examiner—Kyle L. Howell
Assistant Examiner—Francis J. Jaworski
Attorney, Agent, or Firm—Oblon, Fisher, Spivak, McClelland & Maier

[57] ABSTRACT

A digital scan converter employed in a sector scanning ultrasound diagnostic device has a digital memory for storing a received image signal in a cell whose address corresponds to the picture element and a system controller for reading out a signal from the memory by linear scanning. The digital scan converter is further provided with a signal generator and an adder for shifting the level of the image signal by a predetermined value when the signal is written in the memory, a level detector for detecting whether or not the signal read out from the memory is at level "0" and an interpolating section for converting the output signal from the memory into an interpolating signal by the output from the level detector.

9 Claims, 4 Drawing Figures

DIGITAL SCAN CONVERTER

BACKGROUND OF THE INVENTION

1. Field of the Invention

The present invention relates to a digital scan converter which may be used for a sector scanning ultrasound diagnostic device or the like.

2. Description of the Prior Art

Recently, a sector scanning ultrasound diagnostic device has been developed in which a ultrasound beam scans, in a sector shape, a human body and a reflection signal is utilized for forming a tomographic image. This device radiates the ultrasound beam through a gap between two ribs so that the patients' hearts are mainly examined. The tomographic image is generally displayed on a TV screen. This is mainly because various types of TV equipment can be used, various functions thereof are utilized, and images are easily recorded using a VTR. Further, TV monitors have been utilized in a wide range of fields so that high reliability is guaranteed and the images on the TV monitors are free from flickers. As described above, this device collects data by sector scanning. However, a TV monitor displays images on the screen by linear scanning. Therefore, scan conversion is required. The scan conversion is performed in such a manner that an image signal is temporarily stored in an image memory and the order of specifying addresses for writing and reading out is determined in accordance with the order of data collection and image display, respectively. Generally, the image memory has addresses designating elements in two-dimensional orthogonal coordinates. Picture element data of one frame are respectively stored in corresponding addresses in the memory. Since gaps between respective scanning lines become larger when the scanning lines are apart from the radiation center in sector scanning, addresses in which signals are not written are present in the image memory. Therefore, the resolution of images becomes degraded. In order to prevent this, the scanning width of the deflection angle in sector scanning may be narrowed. However, this results in a long operating time for forming a single tomographic image. Further, diagnosis for organs which move at high speed, such as the heart, cannot be effectively performed.

Alternatively, data may be interpolated when reading out from the image memory. However, it is extremely difficult to decide an address for interpolating the corresponding data. The presence or absence of data is generally determined as to whether the level is "0" or not; however, tomographic image data obtained by the ultrasound diagnostic device include data whose level is "0". For this reason, the interpolation may be performed for an address in which data is already stored. As a result, data become inaccurate, decreasing the reliability of the diagnostic device.

SUMMARY OF THE INVENTION

An object of the present invention is to provide a digital scan converter which detects lack of data and estimates this data by interpolation when an image signal obtained by sector scanning is scanned linearly.

The object of the present invention is accomplished by a digital scan converter comprising an adder for adding a signal of a predetermined value to an image signal obtained by sector scanning an object, a memory which stores an output signal from said adder at an address specified by orthogonal coordinates in correspondence with polar coordinates at which the image signal is obtained, a system controller for reading out a signal from the memory by linear scanning, a level detector for detecting the level of a signal read out from the memory, and an interpolating processing section for converting, according to an output signal from the level detector, the signal read out from the memory to an interpolating signal.

DETAILED DESCRIPTION OF THE PREFERRED EMBODIMENTS

Figure 1:
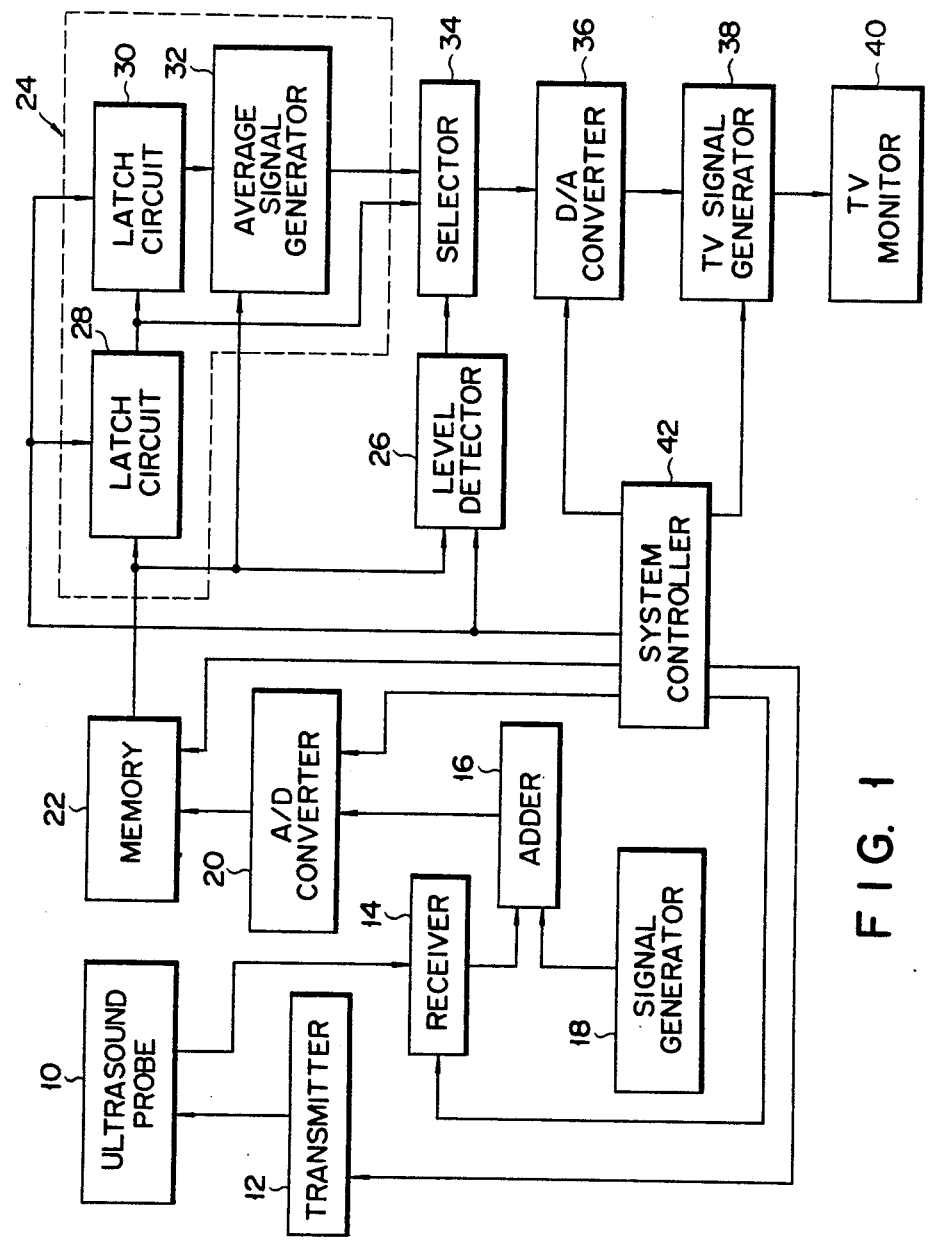
FIG. 1 is a block diagram of a sector scanning ultrasound diagnostic device in which one embodiment of a digital scan converter according to the present invention is employed.

One embodiment of a digital scan converter according to the present invention will be described with reference to the accompanying drawings. FIG. 1 is a block diagram of a sector scanning ultrasound diagnostic device which employs a digital scan converter of the present invention. An ultrasound probe 10 constituted by a number of ultrasound resonators aligned in an array is connected to a transmitter 12 and a receiver 14. An analog image signal from the receiver 14 is supplied to a first input terminal of an adder 16. An output terminal of a signal generator 18 which generates an analog signal having a predetermined value to be described later is connected to a second input terminal of the adder 16. The output signal of the adder 16 is supplied to a memory 22 through an A/D converter 20. The output value of the signal generator 18 is determined to be above the quantization level of the A/D converter 20, preferably above the quantization level and below the level twice as high as the quantization level of the A/D converter 20. The memory 22 stores the image signal for one frame, and addresses are specified in orthogonal coordinates. Generally, the memory 22 has 512 ($=2^9$)×512 cells; this number is close to the 525 scanning lines of one frame for TV, so that the memory cells are suitable for TV display. Each cell has a capacity of 4 or 5 bits for gradation of the image signal. The memory 22 must be utilized independently for reading out and for writing the data for operating the scan converter of this embodiment. The output signal from the memory 22 is supplied to an interpolating circuit 24 and a level detector 26. The interpolating circuit 24 has a series circuit of latch circuits 28 and 30, and an average signal generator 32. The output terminal of the memory 22 is connected to the input terminal of the latch circuit 28 and a first input terminal of the average signal generator 32. The output terminal of the latch circuit 28 is connected to the input terminal of the latch circuit 30 and a first input terminal of a selector 34. The output terminal of the latch circuit 30 is connected to a second input terminal of the average signal generator 32. The output terminal of the average signal generator 32 is connected to a second input terminal of the selector 34. The level detector 26 detects whether or not the input level is "0", and the output terminal thereof is connected to a control terminal of the selector 34. The output signal of the selector 34 is supplied to a TV signal generator 38 through a D/A converter 36. The output signal of the TV signal generator 38 is supplied to a TV monitor 40. A system controller 42 which determines the timing of respective units is connected to the transmitter 12, receiver 14, A/D converter 20, memory 22, level detector 26, latch circuits 28 and 30, D/A converter 36, and TV signal generator 38.

Figure 2:
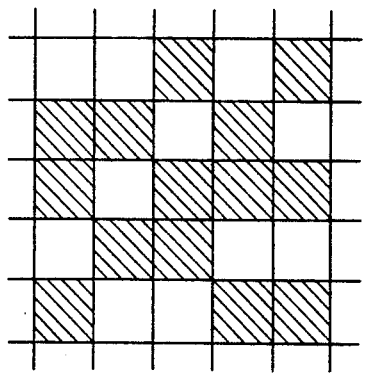
FIG. 2 is an illustrative view for explaining the mode for writing in a memory of the device shown in FIG. 1 an image signal obtained by sector scanning.

The mode of operation of the device will be described. The ultrasound probe 10 is placed at a predetermined position of a body and respective resonators of the ultrasound probe 10 are excited at different phases of output signals transmitted from the transmitter 12. An ultrasound pulse is radiated toward a predetermined direction. An ultrasound signal reflected within the body is supplied to the receiver 14 through the ultrasound probe 10. If the system controller 42 changes the phase difference of excitation of the respective resonators of the probe 10, the radiation direction of the ultrasound pulse is changed. Therefore, the device performs sector scanning with ultrasound. This scanning is generally performed in one section within the body. After the output image signal from the receiver 14 is level-shifted by a predetermined value (this level is indicated as VB) at the adder 16, the output image signal is written in the memory 22. The image signal has positional components designated by polar coordinates whose direction component is designated by the radiation direction of the scanning line (ultrasound) and whose distance element is determined by a timing at which data is obtained within the period of one scanning operation, and the image signal is written in the corresponding cell within the memory 22. In other words, the system controller 42 converts the polar coordinates of the image signal to orthogonal coordinates, and the writing address is specified in the orthogonal coordinates. FIG. 2 is an illustrative view for explaining the mode in which the image signal is written in the memory 22. Assume that ultrasound is radiated from the upper part of the figure; the cross-hatched sections are defined as cells in which image data is written, and the blank sections are defined as cells in which no data is written. In this embodiment, also assume that two cells without data are not consecutively present in the horizontal direction (transverse direction in the figure), and that the cells without data have a level of "0".

When the image signal for one frame which are obtained by ultrasound sector scanning are stored in the memory 22, the memory 22 is placed in the readout mode by the system controller 42. The order of reading out the signal from the memory 22 is different from the order of scanning of a TV monitor 40. The readout address of the memory 22 is fixed at an address in the vertical direction (longitudinal direction in the figure) corresponding to the horizontal scanning line, and is specified so as to sequentially increment in the horizontal direction. In this manner, when the image data are read out from the memory 22, they are displayed on a display unit of linear scanning type. The output digital signal from the memory 22 is converted to an analog signal at the D/A converter 36, and is further converted to a signal for TV monitoring at the TV signal generator 38. Thereafter, the converted signal is displayed at the TV monitor 40.

As shown in FIG. 2, since cells in which no data is written are present within the memory 22, if one of these cells is specified, the readout data is converted to interpolating data, thus preventing degradation of the image quality. For this purpose, in this embodiment, the output signal from the memory 22 is not only supplied to the interpolating circuit 24 but also to the level detector 26. When the level detector 26 receives an input signal whose input level is "0", the level detector 26 outputs a signal of high level. On the other hand, when the level detector 26 receives an input signal whose level is not "0", the level detector 26 outputs a signal of low level. Since all the data obtained by sector scanning are incremented by VB, they have a value larger than 1 in binary notation. In the memory cells which are not accessed in sector scanning, no data is written. Therefore, the value of these cells is "0". If the output signal of the memory 22 is at level "0", the fact that no data is written in the corresponding cell is detected. On the other hand, if the output data from the memory cell is not at level "0", the fact that data is written in the corresponding cell is detected. In response to the level of the output signal from the level detector 26, it may be determined whether or not an interpolating signal in place of the readout signal from the memory 22 is used.

A signal based on the signal of adjacent cells may be generally used as an interpolating signal for the cell. However, in the sector scanning ultrasound diagnostic device, only a one-dimensional linear approximating signal in the horizontal direction (with respect to the deflection direction in sector scanning) may be used. This is because the beam width of the ultrasound pulse radiated from the ultrasound probe 10 cannot be made narrower than the pulse width in the radiating direction (distance direction in sector scanning). In the resolution of the image obtained by sector scanning the ultrasound pulse, the resolution (distance resolution) in the radiating direction of the ultrasound is higher than the resolution (deflection resolution) perpendicular to the distance resolution. The image density of the image at an arbitrarily point is correlated to the vicinity image density in the deflection direction rather than to the vicinity image density in the distance direction. That is, the data in each cell within the memory 22 is correlated to the data of an adjacent cell in the horizontal direction rather than to data of an adjacent cell in the vertical direction. Therefore, in this case, the interpolation is sufficiently accurate by the one-dimensional linear approximation in the horizontal direction.

For this reason, in this embodiment, the output signal from the latch circuit 30 of the latch circuits 28 and 30 connected in series to the output terminal of the memory 22, and the output signal from the memory 22, are supplied to the average signal generator 32. The system controller 42 supplies a clock pulse to the latch circuits 28 and 30 and to the level detector 26 in synchronism with supplying a readout control signal to the memory 22. Data D1 of one cell is latched in the latch circuit 28 from the memory 22 in response to a first clock pulse. At the same time, the data D1 is detected to be at level "0" or not at the level detector 26. The data D1 in the latch circuit 28 is latched in the latch circuit 30 in response to a second clock pulse and is supplied to the first input terminal of the selector 34. At the same time, data D2 in the next cell is supplied to the latch circuit 28 and the level detector 26. The contents of the level detector 26, that is, a signal corresponding to detection of whether or not the data D1 is at level "0", is supplied to the selector 34. The data D1 in the latch circuit 30 is supplied to the average signal generator 32 in response to a third clock pulse. In the same manner as described above, the data D2 in the latch circuit 28 is supplied to the latch circuit 30 and the first input terminal of the selector 34. Data D3 of the next cell within the memory 22 is supplied to the latch circuit 28 and to the average signal generator 32. In this condition, the level detector 26 produces the detection results of the data D2. The average signal generator 32 supplies an average data (D1+D3)/2 to the second input terminal of the selector 34. The data (D1+D3)/2 is obtained by one-dimensional linear approximation of the data D2. Since the Data D2 is supplied to the first input terminal of the selector 34, actual readout data from the memory 22 and interpolating data are supplied to the selector 34. A signal designating whether or not the cell from which the data is read out is accessed in sector scanning is supplied to the control terminal of the selector 34. If the cell is accessed, that is, if the output signal from the level detector 26 is at low level, the selector 34 produces the data which is received from its first input terminal. On the other hand, if the cell is not accessed, that is, when the output signal of the level detector 26 is at high level, the selector 34 generates the data which is received from its second input terminal. Subsequently, every time data is read out from the memory 22, the level of the data in each cell is detected. The readout data is converted to interpolating data in correspondence with the detected results. As a result, a sector scanning ultrasound diagnostic device may be obtained wherein even if the distance from the ultrasound probe 10 is large, sector scanning does not become less precise, eliminating blurring in the image.

In the description above, the level of the cell containing no image data is defined as "0". However, when the data is inverted at the A/D converter 20 and is written in the memory 22, only the cell which contains no image data may have the maximum digital value that the memory cell can designate. In this case, the threshold level of the level detector 26 coincides with this maximum value. Alternatively, a digital value, for example a value higher than 1 in binary notation, corresponding to a level higher than the quantization level of the A/D converter 20, may be added to the output digital signal from the A/D converter 20 to obtain the same results described above, instead of adding an analog signal of a predetermined value to the output analog signal from the receiver 14. Weighted average data of an adjacent cell other than the simple average data may be utilized as the interpolating data.

Figure 4:
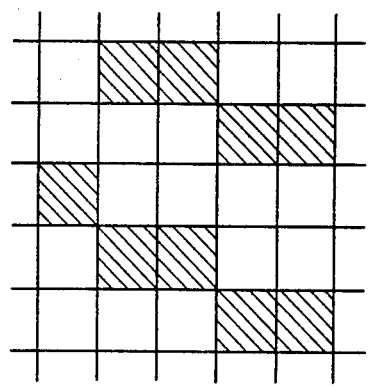
FIG. 4 is an illustrative view for explaining the mode for writing in a memory of the device shown in FIG. 3 an image signal obtained by sector scanning.
Figure 3:
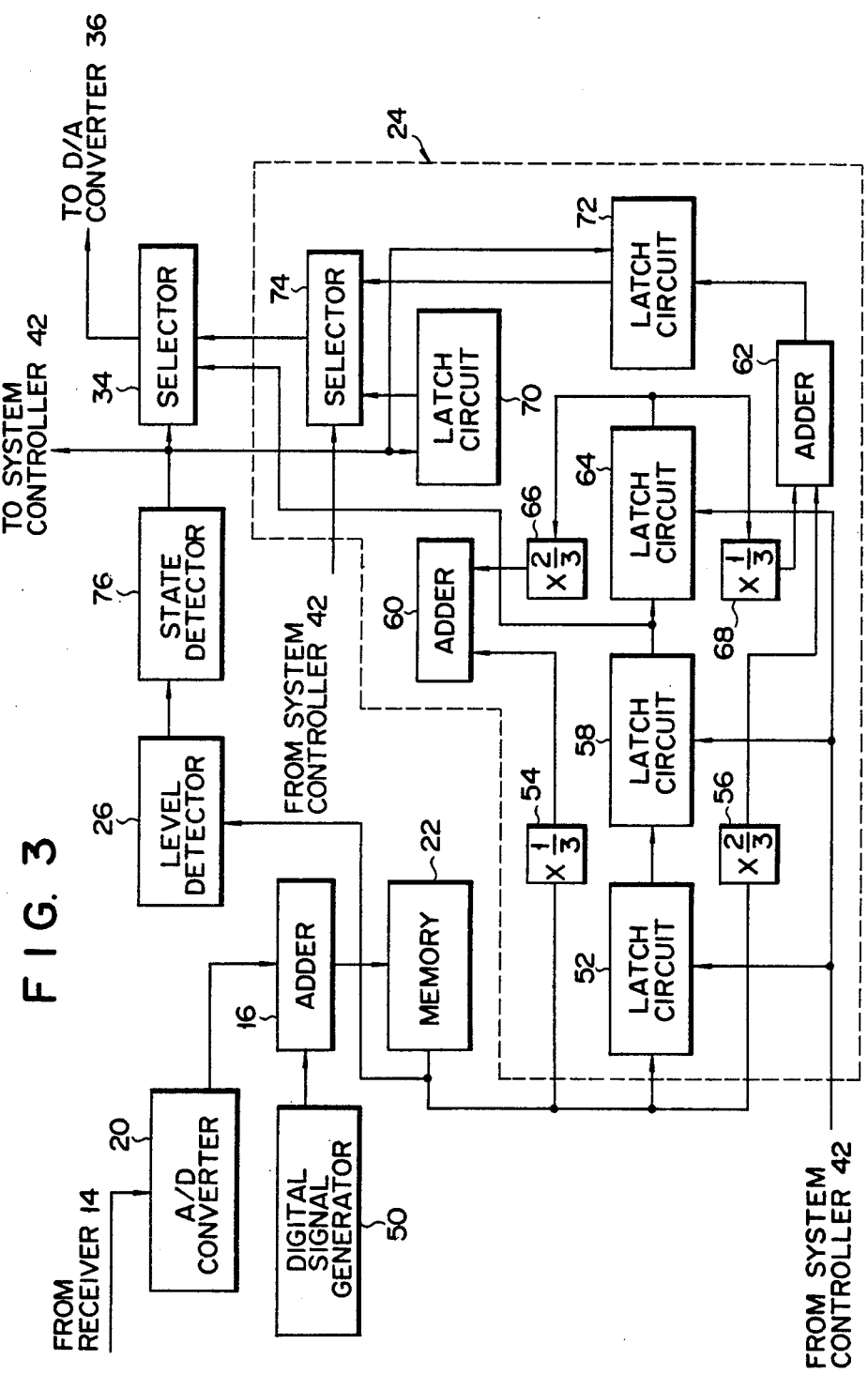
FIG. 3 is a block diagram of a sector scanning ultrasound diagnostic device in which a second embodiment of a digital scan converter according to the present invention is employed.

A second embodiment of the digital scan converter will be described with reference to FIG. 3. FIG. 3 is a view illustrating the main section of a sector scanning ultrasound diagnostic device which employs the second embodiment. The same reference numerals of the second embodiment denote the same parts as shown in the first embodiment, and the description thereof will be emitted. This embodiment is provided with a digital signal generator 50 at the signal generator. The output signal of the digital signal generator 50 is added to the output signal of the A/D converter 20 at the adder 16. The output value of the digital signal generator 50 is 1 in binary notation. The second embodiment is the case in which two cells of the memory are present between the scanning lines in sector scanning as shown in FIG. 4.

The output signal from the memory 22 is supplied to a latch circuit 52, multiplier ($\times \frac{1}{3}$) 54 and multiplier ($\times \frac{2}{3}$) 56. The output signal from the latch circuit 52 is supplied to a latch circuit 58. The output signals from the multipliers 54 and 56 are respectively supplied to first input terminals of adders 60 and 62. The output signal from the latch circuit 58 is supplied to a latch circuit 64 and a first input terminal of the selector 34. The output signal from the latch circuit 64 is supplied to a multiplier ($\times \frac{2}{3}$) 66 and multiplier ($\times \frac{1}{3}$) 68 and the output signals from the multipliers 66 and 68 are respectively supplied to second input terminals of the adders 60 and 62. The output signals from the adders 60 and 62 are then supplied to a first input terminal and a second input terminal of a selector 74 through latch circuits 70 and 72, respectively. The output terminal of the selector 74 is connected to the second input terminal of the selector 74. The output signal from the level detector 26 connected to the output terminal of the memory 22 is further supplied to a state detector 76. The output signal from the state detector 76 is supplied to the clock terminal of the latch circuits 70 and 72, the control terminal of the selector 34 and the system controller 42.

The mode of operation of a digital scan converter according to the second embodiment will be described. The converter in the second embodiment is the same as that in the first embodiment except that operation for adding a signal having a predetermined value to an image signal is performed with digital processing instead of analog processing, until the image signal is written in the memory 22 after performing sector scanning of the ultrasound pulse. Since two cells in which image signal data is not written are present between two cells in which image signal data is written, the data of the cells in which data is not written is interpolated by using the image signal data of the two cells which sandwich the cells having no data. The output signal from the memory 22 is latched sequentially at the latch circuits 52, 58 and 64. The interpolating circuit 24 simultaneously handles with data of four cells. As shown in FIG. 4, in the four horizontally aligned cells, two cells without image signal data are interposed between the cells with image signal data. The output signal from the level detector 26 which detects the level of each cell from which data is sequentially read out can be further detected by the state detector 76. When the output data of low level, high level, high level and low level are generated from the level detector 26, the state detector 76 produces a detecting signal. In this condition, if the output data from the memory 22 are defined as the D1, D2, D3 and D4, data D2 and D3 cannot be barely used. They must be replaced with the interpolating data. At the same time, the adders 60 and 62 respectively produce data 2·D1/3+D4/3 and D1/3+2·D4/3. The latch circuits 70 and 72 latch the output signals from the adders 60 and 62, respectively, in response to the output signal from the state detector 76. This latching period is 2 clock pulse duration. The selector 74 selects output signals from the latch circuits 70 and 72 in the order named. The selector 34 selects the output signal from the selector 74 during the period for which the state detector 76 generates the detecting signal. As a result, the data 2·D1/3+D4/3 and D1/3+2·D4/3 are used in place of the data D2 and D3, respectively. While the state detector 76 does not produce the detecting signal, the output signals from the memory 22 are barely used since the selector 34 selects the output signals from the latch circuits 58. In this manner, according to the second embodiment, two consecutive cells without image data in one horizontal scanning line are properly interpolated. Further, if cells without an image data are present more than three, latch circuits may be connected to the output terminal of the memory 22, corresponding the number of cells without an image data.

In summary, according to the present invention, when an image signal obtained by sector scanning is written in the digital memory, a signal having a predetermined value is added to it so that the picture element data which is not accessed by sector scanning may be easily and properly interpolated when the signal is read out from the memory by linear scanning. As a result, a digital scan converter in which the resolution of the image is high is provided.

The present invention is not limited to the particular embodiments described above. Various changes and modifications may be made within the spirit and scope of the present invention. In the description above, the cases in which a digital scan converter is employed for a sector scanning ultrasound diagnostic device are exemplified. However, the digital scan converter may be adapted to other devices in which the image signal obtained by sector scanning is displayed on a TV monitor by linear scanning, for example, a radar. Further, since a signal of a predetermined value is superposed to the image signal to be written in the memory, gradations for displaying the image density is made less constant. However, if the stored data is displayed in units of 5 bits, 32 gradations is reduced to 31 gradations, thus providing no problem.

What is claimed is:

1. A digital scan converter comprising:
   means for adding a signal of a predetermined value to an image signal obtained by sector scanning an object;
   means, whose address is specified by orthgonal coordinates, for storing an output signal from said adding means in the address specified by the orthogonal coordinates corresponding to polar coordinates at which the image signal is obtained;
   means for reading out a signal from said storing means by linear scanning;
   means for detecting the level of the signal read out from said storing means; and
   interpolating means for converting the signal read out from said storing means into an interpolating signal in response to tne output signal from said detecting means.

2. A digital scan converter according to claim 1, wherein said adding means has a signal generator for generating an analog signal of a predetermined value, an adder for adding the analog image signal obtained by sector scanning and an output signal from said signal generator, and an analog to digital converter for converting an output signal from said adder and for supplying the converted signal to a digital memory, said signal generator having an output level higher than a quantization level of said analog to digital converter.

3. A digital scan converter according to claim 2, wherein the output level of said signal generator is less than the level twice as high as the quantization level of said analog to digital converter.

4. A digital scan converter according to claim 1, wherein said adding means has an analog to digital converter for converting the analog image signal obtained by sector scanning to a digital signal, a signal generator for generating a digital signal of a predetermined value, and an adder for adding output signals from said analog to digital converter and signal generator and for supplying an added signal to said digital memory, the output level of said signal generator being 1 in binary notation.

5. A digital scan converter according to claim 1, wherein data of level "0" is stored in a cell of said storing means in which an image data is not stored and said detecting means detects whether or not the data read out from said storing means is at level "0".

6. A digital scan converter according to claim 1, wherein said interpolating means produces an average signal of data in said storing means read out immediately before and after data whose level is detected by said detecting means, in response to the output signal from said detecting means.

7. A digital scan converter according to claim 6, wherein said interpolating means has first and second latch circuits sequentially connected to an output terminal of said storing means, an average signal generator which produces an average signal of output signals from said storing means and said second latch circuit, and a selector for selectively producing output signals from said first latch circuit and said average signal generator.

8. A digital scan converter according to claim 1, wherein, when said detecting means detects data of two consecutive cells, said interpolating means produces a weighted average signal, as data of the two cells of data which is read out from said storing means immediately before and after the two cells.

9. A digital scan converter according to claim 8 wherein said interpolating means has first, second and third latch circuits connected in series to an output terminal of said storing means; first and second adders for weighting the signal output from said storing means and an output from said third latch circuit in a different manner, and for adding the weighted data; and a selector for sequentially producing output signals of said first and second adders in the order named.

* * * * *